(12) United States Patent
Hagihara et al.

(10) Patent No.: US 7,463,938 B2
(45) Date of Patent: Dec. 9, 2008

(54) CONTROL CALCULATION DEVICE

(75) Inventors: Jun Hagihara, Kitakyushu (JP); Hiroshi Nakamura, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 76 days.

(21) Appl. No.: 10/583,271

(22) PCT Filed: Oct. 21, 2004

(86) PCT No.: PCT/JP2004/015622

§ 371 (c)(1), (2), (4) Date: May 23, 2007

(87) PCT Pub. No.: WO2005/062138

PCT Pub. Date: Jul. 7, 2005

(65) Prior Publication Data

US 2007/0219648 A1 Sep. 20, 2007

(30) Foreign Application Priority Data

Dec. 19, 2003 (JP) ............................ 2003-421799

(51) Int. Cl.
*G05B 13/02* (2006.01)

(52) U.S. Cl. ...................... 700/45; 700/42; 700/54; 318/609; 318/631

(58) Field of Classification Search ............ 700/42, 700/45, 54; 318/609, 610, 616, 631
See application file for complete search history.

(56) References Cited

U.S. PATENT DOCUMENTS

| | | | | |
|---|---|---|---|---|
| 4,727,303 A | * | 2/1988 | Morse et al. ............... 318/616 |
| 4,908,747 A | * | 3/1990 | Lane et al. .................. 700/42 |
| 5,223,778 A | * | 6/1993 | Svarovsky et al. .......... 318/610 |
| 5,504,672 A | * | 4/1996 | Hardiman et al. ............ 700/45 |
| 6,195,596 B1 | * | 2/2001 | Kim ........................... 700/245 |
| 6,424,873 B1 | * | 7/2002 | Przybylski ................... 700/42 |
| 6,970,750 B2 | * | 11/2005 | Wojsznis et al. ............. 700/28 |

FOREIGN PATENT DOCUMENTS

| | | |
|---|---|---|
| JP | 6-30578 A | 2/1994 |
| JP | 3214270 B2 | 7/2001 |
| JP | 2001-249720 A | 9/2001 |

OTHER PUBLICATIONS

International Search Report of PCT/JP2004/015622 date of mailing Feb. 1, 2005.

* cited by examiner

*Primary Examiner*—Albert DeCady
*Assistant Examiner*—Douglas S Lee
(74) *Attorney, Agent, or Firm*—Westerman, Hattori, Daniels & Adrian, LLP.

(57) ABSTRACT

When there exists an error between a model considered in feed-forward and an actual device, it is configured so as to enable the application of control having feed-forward such as predictive control without problem to reduce a model error. Furthermore, it is configured to enable more fine adjustment of the actual device by adjusting the balance of gains α and β. An operational unit is provided with an error signal calculation unit for outputting an error command and an error feedback value based on a position feed-forward signal and a position detection value, and an error compensation operation unit for controlling so that the error command and the error feedback value coincides with each other. This operational unit is provided at a control operation device.

7 Claims, 3 Drawing Sheets

CONTROL CALCULATION DEVICE

FIELD OF THE INVENTION

The present invention relates to a control operation device capable of controlling a position of a controlled object as instructed by a command. For example, it relates to a control operation device for use in a servo control device for performing positioning control of a load machine connected to an electric motor by generating a current (torque) command to the electric motor based on an inputted position command and a detected position/speed detection value of the electric motor.

BACKGROUND OF THE INVENTION

In a conventional control operation device using a feed-forward signal, PID control is performed so that a position feed-forward signal and a position detection value coincide with each other and that a speed feed-forward signal and a speed detection value coincide with each other. (see, e.g., Japanese Patent No. 3,214,270 (JP '270))

FIG. 7 is a block diagram showing a structure of a conventional motor control system for controlling a position, etc., of a motor. In this figure, the reference numeral "1" denotes an electric motor for driving machinery as a load, "2" denotes a torque transmission mechanism connected to the electric motor 1, "3" denotes load machinery to be driven by the electric motor 1 connected to the torque-transmission mechanism 2, "19" denotes a position and speed detector which detects an actual speed and an actual position of the electric motor 1 and outputs an actual speed signal $\omega_M$ and an actual position signal $\theta_M$, and "5" denotes a torque control circuit.

A subtracter 24 subtracts a first simulated position signal $\theta_{A1}$ from a position command signal $\theta_M^*$, and outputs the obtained error signal $(\theta_M^*-\theta_{A1})$ to the first position control circuit 25. The first position control circuit 25 outputs a first speed signal $\omega_1^*$ to a subtracter 26 so as to decrease the error signal $(\theta_M^*-\theta_{A1})$ to control so that $\theta_{A1}$ follows $\theta_M^*$. The subtracter 26 subtracts a first simulated speed signal $\omega_{A1}$ from the first speed signal $\omega_1^*$ which is an output of the first position control circuit 25, and outputs the obtained error signal $(\omega_1^*-\omega_{A1})$ to a first speed control circuit 16. The first speed control circuit 16 inputs the error signal $(\omega_1^*-\omega_{A1})$ to control so that the error signal $(\omega_1^*-\omega_{A1})$ decreases, and outputs a first torque signal $T_1^*$ to a subtracter 15. The subtracter 15 subtracts an output $T_c$ of a compensating torque operational circuit 14 from the first torque signal $T_1^*$, and outputs the obtained third torque signal $T_3^*$ to an adder 6 and a subtracter 18. The subtracter 18 subtracts a simulated transfer torque signal $T_F$ which is an output of the torque transmission mechanism simulated circuit 10 from the third torque signal $T_3^*$, and outputs the obtained error signal $(T_3^*-T_F)$ to an electric motor simulated circuit 27. The electric motor simulated circuit 27 simulates the transfer function of the electric motor 1, inputs $(T_3^*-T_F)$, outputs a first simulated position signal $\theta_{A1}$ to a subtracter 20 and the subtracter 24, and further outputs a first simulated speed signal $\omega_{A1}$ to a subtracter 11, a subtracter 12 and a subtracter 22. The subtracter 11 subtracts a second simulated speed signal $\omega_{A2}$ from the first simulated speed signal $\omega_{A1}$, and outputs the obtained error signal $(\omega_{A1}-\omega_{A2})$ to the torque transmission mechanism simulated circuit 10. The torque transmission mechanism simulated circuit 10 simulates the transfer function of the torque transmission mechanism 2, inputs the error signal $(\omega_{A1}-\omega_{A2})$, and outputs a simulated transfer torque signal $T_F$ to the load machinery simulated circuit 9 and the subtracter 18. The load machinery simulated circuit 9 simulates the transfer function of the load machinery 3, inputs the torque signal $T_F$, and outputs the second simulated speed signal $\omega_{A2}$ to the subtracter 11 and the subtractor 12. The subtracter 12 subtracts the second simulated speed signal $\omega_{A2}$ from the first simulated speed signal $\omega_{A1}$, and outputs the obtained error signal $(\omega_{A1}-\omega_{A2})$ to a compensating torque operational circuit 14. The compensating torque operational circuit 14 inputs the error signal $(\omega_{A1}-\omega_{A2})$, and outputs a compensating torque signal $T_C$ to the subtracter 15 so that the load machinery follows the speed command signal $\omega_M^*$. The subtracter 20 subtracts an actual position signal $\theta_M$ from the first position signal $\theta_{A1}$, and outputs the obtained error signal $(\theta_{A1}-\theta_M)$ to a second position control circuit 21. The second position control circuit 21 outputs the speed signal $\omega_2^*$ to the adder 22 so that the error signal $(\theta_{A1}-\theta_M)$ decreases to control so that $\theta_M$ follows $\theta_{A1}$. The adder 22 adds the first speed signal $\omega_{A1}$ and a second speed signal $\omega_2^*$ and outputs to a subtracter 23. The subtracter 23 subtracts the actual speed signal $\omega_M$ from an output of the adder 22, and outputs the obtained error signal $(\omega_2^*+\omega_{A1}-\omega_M)$ to a second speed control circuit 8. The second speed control circuit 8 outputs a second torque signal $T_2^*$ to the adder 6 so that the velocity error $(\omega_{A1}-\omega_M)$ decreases to control so that the actual speed signal $\omega_M$ follows the first simulated speed signal $\omega_{A1}$. The adder 6 adds the third torque signal $T_3^*$ and the second torque signal $T_2^*$, and outputs the obtained torque command signal $T_M^*$ to the torque control circuit 5. The torque control circuit 5 inputs a torque command signal $T_M^*$ to drive the electric motor 1. The electric motor 1 drives the load mechanism 3 via the torque transmission mechanism 2. Moreover, the electric motor 1 is provided with a position and speed detector 19 for detecting the actual speed and the actual position of the electric motor 1 to output the actual speed signal $\omega_M$ and the actual position signal $\theta_M$.

FIG. 8 is a block diagram explaining a second speed control circuit 8. In this diagram, the speed control circuit 8 includes a coefficient multiplier 108 having a proportional gain $K_{V2}$ and an integrator 109 having an integral gain $K_{i2}$. When the velocity error signal $(\omega_{A1}-\omega_M)$ is inputted, proportional plus integral control is performed to output a torque signal $T_2^*$. Therefore, even if disturbance torque is added, it can be controlled so that the speed $\omega_M$ of the electric motor 1 follows the first simulated speed signal $\omega_{A1}$. As mentioned above, since it is controlled so that the $\omega_{A1}$ follows $\omega_M^*$ by the first speed control circuit 16, the speed $\omega_M$ of the electric motor 1 is finally controlled so as to follow the speed command signal $\omega_M^*$.

FIG. 9 is a block diagram explaining the second position control circuit 21. In this diagram, the coefficient multiplier 202 having a gain $K_{P2}$ performs proportional amplification of the position error $(\theta_{A1}-\theta_M)$, and outputs a second speed signal $\omega_2^*$. Since it is controlled such that $\theta_{A1}$ follows $\theta_M^*$, the position $\theta_M$ of the electric motor 1 is controlled so as to finally follow the position command signal $\theta_M^*$.

In this way, a conventional control operation device performs PID control based on the error signal of the feed-forward signal $\theta_{A1}$ and $\omega_{A1}$ and the detection value $\theta_M$ and $\omega_M$ to attenuate the impact of errors of a feed-forward model or unknown disturbance torques.

In a conventional control operation device, PID control is performed, and adjustment is only performed by three control parameter values of a proportional gain $K_p$ ($K_{P2}$ in a conventional case) of a feedback position loop, a proportional gain $K_v$ ($K_{V2}$ in a conventional case) of a speed loop, and an integral gain $K_i$ ($K_{i2}$ in a conventional case). Therefore, there was a drawback that disturbance characteristics cannot be finely adjusted to decrease influences by modeling errors and/or disturbances.

Moreover, for example, if control such as predictive control, which demonstrates an effect by the balance of feed-forward control and feedback control, is used to improve the disturbance characteristic, there was also a problem that the use of such control causes a deterioration of the control performance.

The present invention was made in view of such problems, and aims to provide a control operation device capable of finely adjusting the disturbance characteristic which attenuates the impact of a modeling error and/or a disturbance even in cases where a feed-forward model has an error to an actual controlled object or there was an unknown disturbance which was not considered in a model, and also capable of applying control such as predictive control which demonstrates an effect by the balance of feedback control to improve command following capability.

SUMMARY OF THE INVENTION

In the present invention, a control operation device which receives a position feed-forward signal (xff), a torque feed-forward signal (tff), and a position detection value (xfb) of a controlled object, calculates a manipulated variable so that the position detection value (xfb) coincides with the position feed-forward signal (xff), and outputs the manipulated variable, including an error signal calculation unit and an error compensation operation unit.

The error signal calculation unit outputs a signal given by multiplying an error (err) given by subtracting the position detection value (xfb) from the position feed-forward signal (xff) by a gain $\alpha$ as an error command (err_ref), and outputs a signal given by changing a sign of the error (err) and multiplying a gain $\beta$ as an error feedback value (err_fb).

The error compensation operation unit controls so that the error command (err_ref) and the error feedback value (err_fb) coincide, and outputs an error torque command value (err_tref), and adds the torque feed-forward signal (tff) and the error torque command value (err_tref) to give the manipulated variable (tref).

According to the present invention, in cases where a feed-forward model has an error to an actual controlled object or there is an unknown disturbance not considered in a model, there is an advantage that the disturbance characteristic can be adjusted finely by adjusting a gain $\alpha$ and a gain $\beta$ in addition to three control-parameter values which were adjusted in a conventional control operation device. Moreover, in cases where control which demonstrates an effect by a balance of a feedback control is used to improve the disturbance characteristic, for example, a command following capability of, e.g., a predictive control, there is an effect that the control performance can be kept well and as a result the entire control performance can be improved.

Moreover, according to another aspect of the invention, there is an effect that apart from an original feed-forward control, a control having a feed-forward can be applied without problem to reduce errors, and as a result the control performance can be improved.

Moreover, according to another aspect of the invention, there is an effect that apart from original feed-forward control, prediction control can be applied without problem to reduce errors, and as a result the control performance can be improved.

Moreover, according to another aspect of the invention, since a function which correlates two parameters is decided preliminarily, there is an effect that an adjustment time can be shortened by parameters for adjustment in union.

BRIEF DESCRIPTION OF THE DRAWINGS

A preferred embodiment of the present invention will be described with reference to the accompanying drawing wherein.

DETAILED DESCRIPTION OF THE INVENTION

Figure 7:
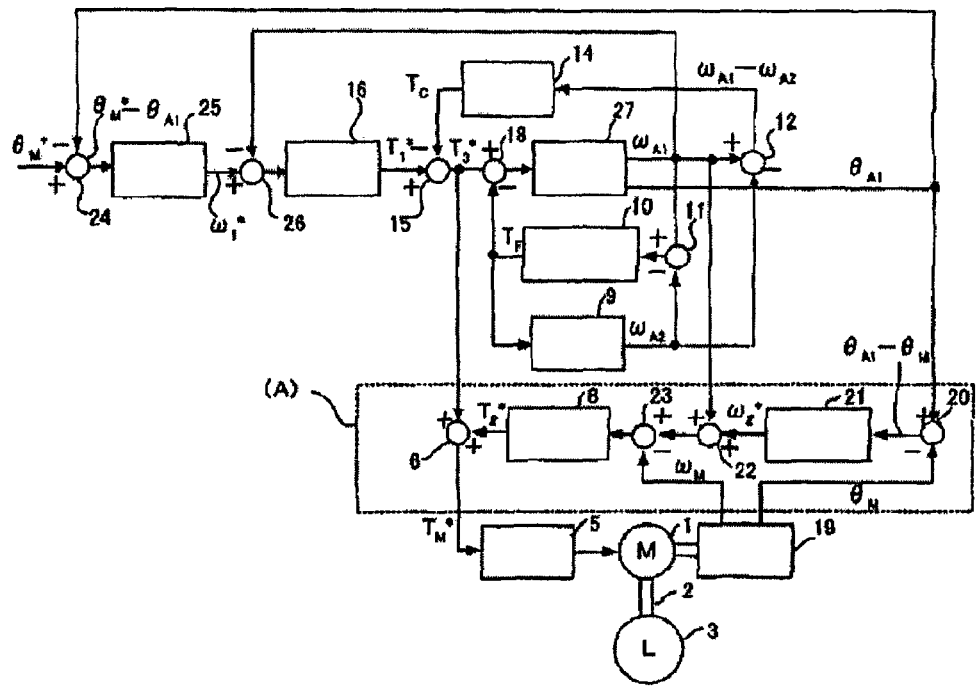
FIG. 7 is a block diagram showing a structure of a conventional control operation device.
Figure 8:
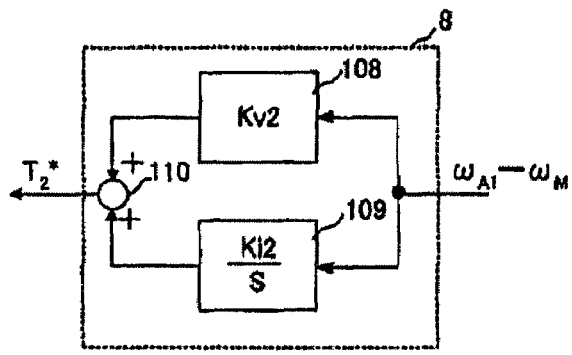
FIG. 8 is a block diagram showing a structure of a second speed control circuit.
Figure 9:
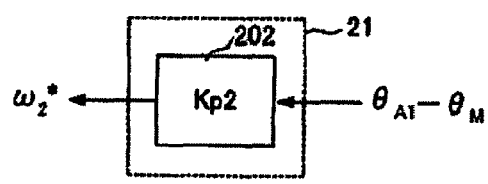
FIG. 9 is a block diagram showing a structure of a second position control circuit.

Hereafter, a control operation device according to the present invention will be explained with reference to the drawings. The control operation device according to the present invention explained below is an improvement of the portion (A) shown by the dashed line of the conventional control system shown in FIG. 7.

Figure 1:
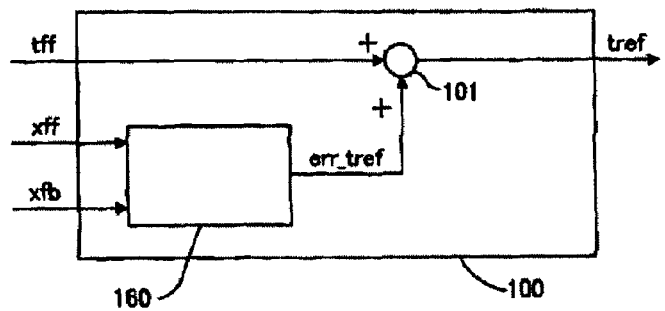
FIG. 1 is a block diagram of a first embodiment showing a structure of a control operation device according to the present invention.
Figure 2:
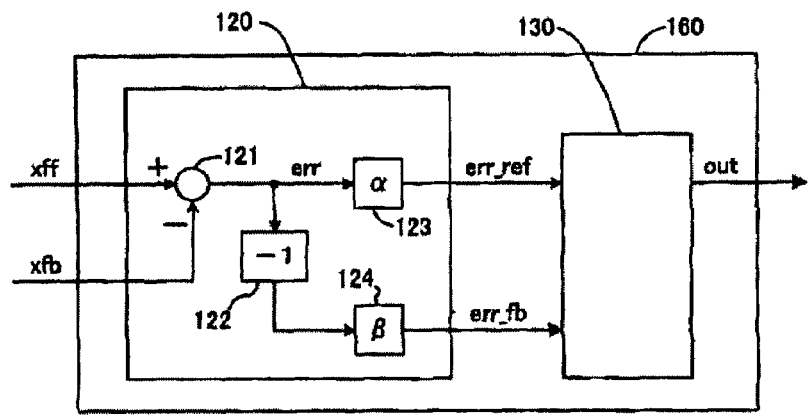
FIG. 2 is a block diagram showing a structure of an operation device.

FIG. 1 is a block diagram showing a structure of an embodiment of a first embodiment of a control operation device according to the present invention. In FIG. 1, "100" denotes a control operation device of the present invention, "101" denotes an adder, and "160" denotes an operational unit. FIG. 2 is a block diagram showing the structure of the operational unit 160. In FIG. 2, "120" denotes an error signal calculation unit, "130" denotes an error compensation operation unit, "121" denotes a subtracter, "122" is a sign inverter, "123" denotes an amplifier having a gain $\alpha$, and "124" denotes an amplifier having a gain $\beta$.

In such a structure of the control operation device 100, when a torque feed-forward signal tff is inputted into the adder 101 and a position feed-forward signal xff and position detection signal xfb are inputted into the error signal calculation unit 120, the adder 101 inputs the torque feed-forward signal tff and an error torque command err_tref calculated by the operation machine 160 to add them, and outputs a torque command tref. When the subtracter 121 of the error signal calculation unit 120 receives an a position feed-forward signal xff and a position detection signal xfb, calculates a position error err by performing the subtraction, and outputs the position error err to the sign inverter 122 and the amplifier 123 having a gain $\alpha$. The sign inverter 122 reverses the sign of the inputted position error err and outputs it to the amplifier 124 having a gain $\beta$. The amplifier 123 outputs an error command err_ref as an operation result to an error compensation operation unit 130, and the amplifier 124 outputs an error feedback value err_fb as an operation result to an error compensation operation unit 130. The relation of the input/output of this error signal calculation unit 120 is expressed by the following expressions.

$$err\_ref = \alpha \cdot (xf\!f - xf\!b) \quad (1)$$

$$err\_fb = \beta \cdot (xf\!b - xf\!f) \quad (2)$$

In these expressions, two gains α and β denote gains which can be set arbitrarily. At this time, if the relation is correlated such that the sum of α and β becomes a fixed value 1 (α+β=1), it becomes possible to simplify the adjustment since adjusting one of them determines the other. The correlation of α and β is not limited to such expressions, and can be set arbitrarily.

The error compensation operation unit 130 receives the error command err_ref and the error feedback value err_fb, performs an error correction operation so that they coincides to obtain an error torque command err-tref, and then outputs the error torque command to the adder 101.

Figure 3:
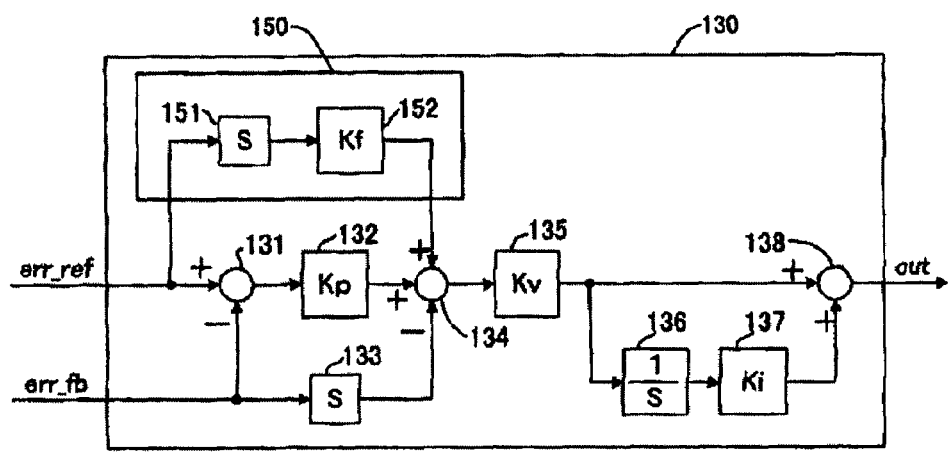
FIG. 3 is a block diagram showing a structure of an error compensation operation unit.

FIG. 3 is a block diagram showing the structure of the error compensation operation unit 130. In FIG. 3 "131" and "134" denote subtracters, and "138" denotes an adder. Furthermore, "151" and "133" denote differentiators, "136" denotes an integrator, and "S" denotes a Laplace operator. "132," "135," "137," and "152" are amplifiers having a gain $K_p$, $K_v$, $K_i$, $K_f$, and the differentiator 151 and the amplifier 152 constitute an FF controller 150. In the case of performing control for according the error command err_ref and the error feedback value err_fb as explained here, the structure is not limited to the illustrated one. For example, PID control can be employed, or control consisting of feed-forward control and feedback control, such as 2-freedom-degree control using a model of a controlled object, can be employed. Furthermore, an inverse transfer function compensation using a model of a controlled object or the like can be employed.

In this embodiment, the following explanation will be directed to the case in which control consisting of feed-forward control and feedback control as shown in FIG. 3 is used. In FIG. 3, "150" denotes a feed-forward control portion, and the output of the error compensation operation unit 130 is calculated by the expression 3.

$$out = K_V \cdot (1 + K_i/s) \cdot \{K_p \cdot (err\_ref - err\_fb) + K_f \cdot s \cdot err\_ref - s \cdot err\_fb\} \quad (3)$$

Thus, at the time of adjusting the disturbance characteristic, the disturbance characteristic can be more finely adjusted since the gain α and the gain β as well as gains $K_p$, $K_v$, $K_i$, and $K_f$ can be adjusted, resulting in improved control performance.

Figure 4:
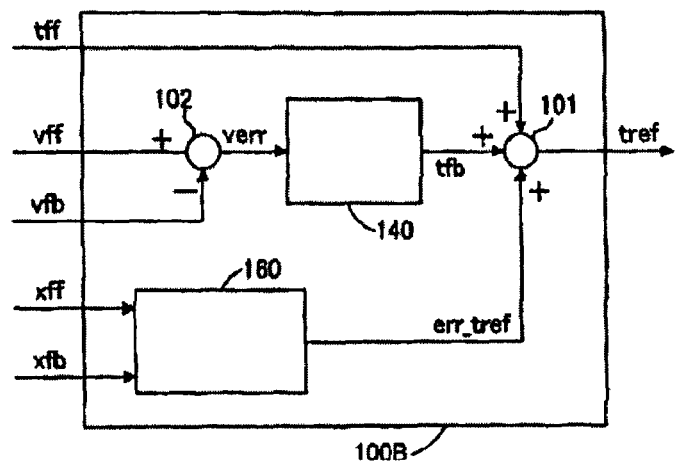
FIG. 4 is a block diagram according to a second embodiment.

FIG. 4 is a view showing the structure of a second embodiment. All the elements having the same reference sign as in FIGS. 1 and 2 correspond to the elements shown in FIGS. 1 and 2. This embodiment 2 is different from the first embodiment 1 in that a speed feed-forward signal vff in addition to the feed-forward signal of the position and the torque is inputted and that a speed control portion 140 is added. In the speed control portion 140, proportional plus integral control is generally used in many cases.

In this case, the error verr between the speed feed-forward signal vff and the speed detection value vfb is inputted into the speed control portion 140, and the feedback torque command tfb outputted from the speed control portion 140, the torque feed-forward signal tff, and the error torque command err_tref outputted from the error compensation operation unit 130 of the operational unit 160 are added into a torque command value tref which is a manipulated variable.

As explained above, since it is constituted that the usual speed control portion 140 for compensating the error between the speed feed-forward signal vff and the speed detection value vfb separately from the error torque command err_tref calculated by the error compensation operation unit 130 in order to compensate the error using the position error err is also provided, the characteristic to the disturbance can be improved.

Figure 5:
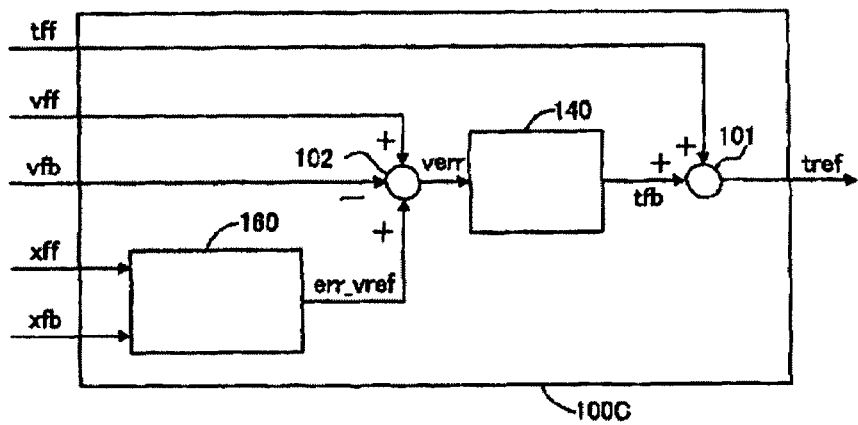
FIG. 5 is a block diagram according to a third embodiment.

FIG. 5 is a view showing a structure of a third embodiment. The third embodiment 3 is the same as the second embodiment 2 in structure element, but is different from the second embodiment 2 in that the output of the error compensation operation unit 130 in the operational unit 160 shown in FIG. 5 serves as an error speed command err_vref as opposed to that the output of the error compensation operation unit 130 in the operational unit 160 serves as an error torque command err_tref.

In this case, the speed feed-forward vff and the error speed command err_vref are added and the speed detection value vfb is subtracted therefrom to serve as a speed error verr to be inputted into the speed control portion 140, and the feedback torque command tfb which is an output of the speed control portion 140 and the torque feed-forward signal tff are added to be outputted as a torque command tref which is a manipulated variable.

The error compensation operation unit 130 of this embodiment shows the case where predictive control is used.

As predictive control, for example, devices, such as, e.g., a "preview-control device" disclosed by Japanese Unexamined Laid-open Patent Publication No. H07-028508, and a "preview-control device" disclosed by Japanese Unexamined Laid-open Patent Publication No. H05-820489, are known. In cases where the invention disclosed by Japanese Unexamined Laid-open Patent Publication No. H07-028508 is used, provided that this sampling is $i^{th}$ sampling, the control input u(i) which minimizes the evaluation function J shown by the expression (5) including a prediction interval M, a detection delay K, a weighting coefficient $W_m$, a weighting coefficient α, a weighting coefficient c, a weighting coefficient $c_d$, this time position error e(i−K), and a predicted value e*(i+m) of the error ahead of m pieces is obtained by the expression (6).

[Expression 1]

$$r(i) = err\_ref(i), \quad y(i) = err\_fb(i), \quad u(i) = vref\_err(i) \quad (4)$$

$$J = \sum_{m=1}^{M} w_m \{e^*(i+m) + \alpha * e(i-K)\}^2 + c\{u(i)\}^2 + c_d\{\Delta u(i)\}^2 \quad (5)$$

$$u(i) = \sum_{m=-K+1}^{M} v_m \Delta r(i+m) - \sum_{n=0}^{N_a-1} p_n \Delta y(i-K-n) - \sum_{n=1}^{N_b+K-1} g_n u(i-n) + Ee(i-K) \quad (6)$$

Here, Δr(i) represents an incremental value for every control period of the command r(i), and Δy(i) represents an incremental value for every control period of the output y(i) of the controlled object. Moreover, "Na" and "Nb" represent the degree of the denominator and the degree of the numerator, respectively, when the transfer characteristic from the control input "u" to Δy is represented by a pulse transfer function.

The parameters $v_m$, $p_n$, $g_n$, and E in the expression (6) are values calculated from a model of a controlled object and the weighting coefficients, and since the calculation method is disclosed by the "preview-control device" described in Japanese Unexamined Laid-open Patent Publication No. H07-028508, the detail will be omitted here.

Thus, only by substituting a position control portion of a conventional device with the system of the present invention, it becomes possible to apply predictive control, which could not be applied until now, resulting in improved control performance.

Figure 6:
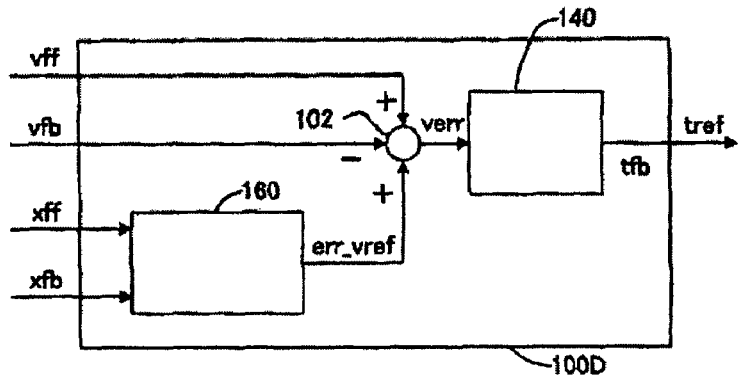
FIG. 6 is a block diagram according to a fourth embodiment.

FIG. 6 is a figure showing a structure of a fourth embodiment. The fourth embodiment 4 is almost the same as the third embodiment 3 shown in FIG. 5, but is different only in that the torque feed-forward signal tff is not inputted. This structure can be effectively used in cases where, e.g., a response becomes oscillating or torque saturation occurs when a torque feed-forward signal is used. Thus, even in a structure not using a torque feed-forward signal, it becomes possible to demonstrate the effects of the present invention.

When there exists an error between the model considered in a feed-forward and the actual device, control having a feed-forward like predictive control for the purpose of reducing a model error can be applied without problem. Furthermore, since the response of an actual device can be finely adjusted by adjusting the balance of gains α and β, the present invention can be applied to, e.g., a semiconductor producing equipment, an electronic component mounting device, a robot, or a machine tool, which require high-speed response and highly precise positioning.

We claim:

1. A control operation device which receives a position feed-forward signal (xff), a torque feed-forward signal (tff), and a position detection value (xfb) of a controlled object, calculates a manipulated variable so that the position detection value (xfb) coincides with the position feed-forward signal (xff), and outputs the manipulated variable, the control operation device, comprising:
   an error signal calculation unit; and
   an error compensation operation unit,
   wherein the error signal calculation unit outputs a signal given by multiplying an error (err) given by subtracting the position detection value (xfb) from the position feed-forward signal (xff) by a gain α as an error command (err_ref), and outputs a signal given by changing a sign of the error (err) and multiplying a gain β as an error feedback value (err_fb), and
   wherein the error compensation operation unit controls so that the error command (err_ref) and the error feedback value (err_fb) coincide, and outputs an error torque command value (err_tref), and adds the torque feed-forward signal (tff) and the error torque command value (err_tref) to give the manipulated variable (tref).

2. A control operation device comprising a speed control portion which receives a position feed-forward signal (xff), a speed feed-forward signal (vff), a torque feed-forward signal (tff), a position detection value (xfb) of a controlled object, and a speed detection value (vfb) of the controlled object, calculates a manipulated variable so that the position detection value (xfb) of the controlled object coincides with the position feed-forward signal (xff), and outputs the manipulated variable,
   the control operation device, comprising:
   an error signal calculation unit; and
   an error compensation operation unit,
   wherein the error signal calculation unit outputs a signal given by multiplying an error (err) given by subtracting the position detection value (xfb) from the position feed-forward signal (xff) by a gain (α) as an error command (err_ref), and outputs a signal given by changing a sign of the error (err) and multiplying a gain (β) as an error feedback value (err_fb), and
   wherein the error compensation operation unit controls so that the error command (err_ret) and the error feedback value (err_fb) coincides and outputs an error torque command value (err_tref),
   inputs a signal (verr) given by subtracting a speed detection value (vfb) from the speed feed-forward signal (vff) into the speed control portion, and
   adds the torque feed-forward signal (tff), a feedback torque command value (tfb) outputted from the speed control portion, and the error torque command value (err_tref) to give the manipulated variable (tref).

3. A control operation device comprising a speed control portion which receives a position feed-forward signal (xff), a speed feed-forward signal (vff), a torque feed-forward signal (tff), a position detection value (xfb) of a controlled object, and a speed detection value (vfb) of the controlled object, calculates a manipulated variable so that the position detection value (xfb) of the controlled object coincides with the position feed-forward signal (xff), and outputs the manipulated variable,
   the control operation device, comprising:
   an error signal calculation unit; and
   an error compensation operation unit,
   wherein the error signal calculation unit outputs a signal given by multiplying an error (err) given by subtracting the position detection value (xfb) from the position feed-forward signal (xff) by a gain (α) as an error command (err_ref), and outputs a signal given by changing a sign of the error (err) and multiplying a gain (β) as an error feedback value (err_fb), and
   wherein the error compensation operation unit controls so that the error command (err_ref) and the error feedback value (err_fb) coincides and outputs an error speed command value (err_vref),
   inputs a signal (verr) given by adding the speed feed-forward signal (vff) and the error speed command value (err_vref) and subtracting a speed detection value (vfb) therefrom into the speed control portion, and
   adds the torque feed-forward signal (tff) and a feedback torque command value (tfb) outputted from the speed control portion to give the manipulated variable (tref).

4. A control operation device comprising a speed control portion which receives a position feed-forward signal (xff), a speed feed-forward signal (vff), a position detection value (xfb) of a controlled object, and a speed detection value (vfb) of the controlled object, calculates a manipulated variable so that the position detection value (xfb) of the controlled object coincides with the position feed-forward signal (xff), and outputs the manipulated variable,
   the control operation device, comprising:
   an error signal calculation unit; and
   an error compensation operation unit,
   wherein the error signal calculation unit outputs a signal given by multiplying an error (err) given by subtracting the position detection value (xfb) from the position feed-forward signal (xff) by a gain (α) as an error command (err_ref), and outputs a signal given by changing a sign of the error (err) and multiplying a gain (β) as an error feedback value (err_fb), and
   wherein the error compensation operation unit controls so that the error command (err_ref) and the error feedback value (err_fb) coincides and outputs an error speed command value (err_vref),
   inputs a signal (verr) given by adding the speed feed-forward signal (vff) and the error speed command value (err_vref) and subtracting a speed detection value (vfb) therefrom into the speed control portion, and gives a signal outputted from the speed control portion as the manipulated variable (tref).

5. The control operation device as recited in any one of claims 1 to 4, wherein the error compensation operation unit performs feed-forward control and feedback control.

6. The control operation device as recited in any one of claims 1 to 4, wherein the error compensation operation unit performs predictive control for determining a control input so that an evaluation function about a predicted value of a future error obtained by using a model of a controlled object and a control input are minimized, wherein the future error is a difference between the error command (err_ref) and the error feedback value (err_fb), and wherein the control input is given as an output of an error compensation operation unit.

7. The control operation device as recited in any one of claims 1 to 4, wherein a relation between the gain $\alpha$ and the gain $\beta$ is expressed by a predetermined function, whereby when one of gain values is decided, the other is determined automatically.

* * * * *